(12) United States Patent
Oda et al.

(10) Patent No.: US 8,395,598 B2
(45) Date of Patent: Mar. 12, 2013

(54) POSITION DETECTION APPARATUS

(75) Inventors: Yasuo Oda, Saitama (JP); Yoshihisa Sugiyama, Saitama (JP)

(73) Assignee: Wacom Co., Ltd., Saitama (JP)

(*) Notice: Subject to any disclaimer, the term of this patent is extended or adjusted under 35 U.S.C. 154(b) by 292 days.

(21) Appl. No.: 12/955,747

(22) Filed: Nov. 29, 2010

(65) Prior Publication Data

US 2011/0216032 A1 Sep. 8, 2011

(30) Foreign Application Priority Data

Mar. 5, 2010 (JP) .................. 2010-049743

(51) Int. Cl.
*G06F 3/045* (2006.01)
*G06F 3/041* (2006.01)
*G06F 3/033* (2006.01)
*G06F 3/044* (2006.01)
*G06F 3/046* (2006.01)

(52) U.S. Cl. ..... 345/174; 345/173; 345/179; 178/18.01; 178/18.06; 178/18.07; 178/19.01; 178/19.03

(58) Field of Classification Search .......... 345/156–157, 345/173–179, 204–206, 55, 104; 178/18.01–20.04
See application file for complete search history.

(56) References Cited

U.S. PATENT DOCUMENTS

| | | | | |
|---|---|---|---|---|
| 5,402,151 A | * | 3/1995 | Duwaer | 345/173 |
| 5,646,377 A | * | 7/1997 | Oda | 178/18.07 |
| 5,790,106 A | * | 8/1998 | Hirano et al. | 345/173 |
| 6,611,258 B1 | * | 8/2003 | Tanaka et al. | 345/179 |
| 6,628,269 B2 | * | 9/2003 | Shimizu | 345/173 |
| 7,436,393 B2 | * | 10/2008 | Hong et al. | 345/173 |
| 2003/0098858 A1 | * | 5/2003 | Perski et al. | 345/173 |
| 2011/0069022 A1 | * | 3/2011 | Yokota et al. | 345/173 |
| 2011/0115741 A1 | * | 5/2011 | Lukas et al. | 345/174 |

FOREIGN PATENT DOCUMENTS

JP 10020992 A 1/1998

* cited by examiner

*Primary Examiner* — Lun-Yi Lao
*Assistant Examiner* — Jarurat Suteerawongsa
(74) *Attorney, Agent, or Firm* — Seed IP Law Group PLLC

(57) ABSTRACT

A position detection apparatus is provided, which includes a plurality of position detection systems such as an electromagnetic-type position detection system and a capacitive-type position detection system. The apparatus is configured to select a transmission conductor among a plurality of transmission conductors in a first position detection system, and to select a reception conductor among a plurality of reception conductors in a second position detection system, so as to increase the spatial distance between the selected transmission conductor in the first position detection system and the selected reception conductor in the second position detection system as much as possible, to thereby reduce interference. Further, a relationship of frequency interleave may be provided between a transmission signal to be supplied to the transmission conductor in the first position detection system and another transmission signal to be supplied to the transmission conductor in the second position detection system.

20 Claims, 8 Drawing Sheets

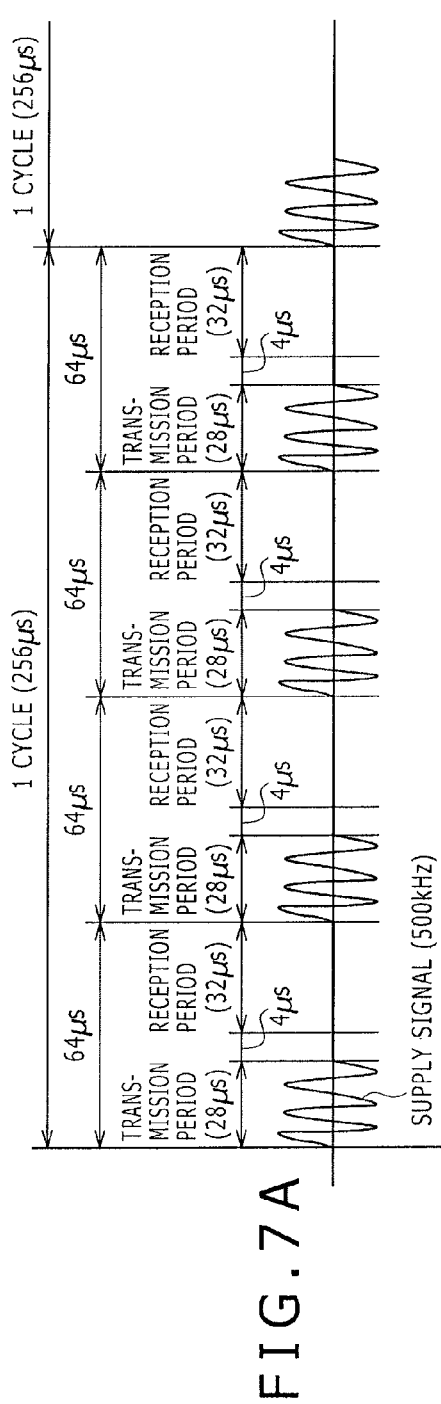
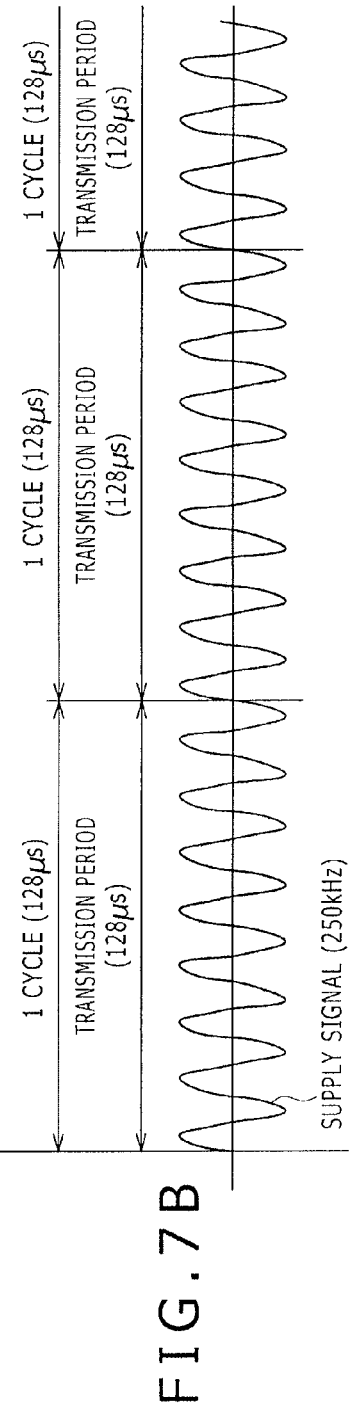
FIG. 7A
FIG. 7B

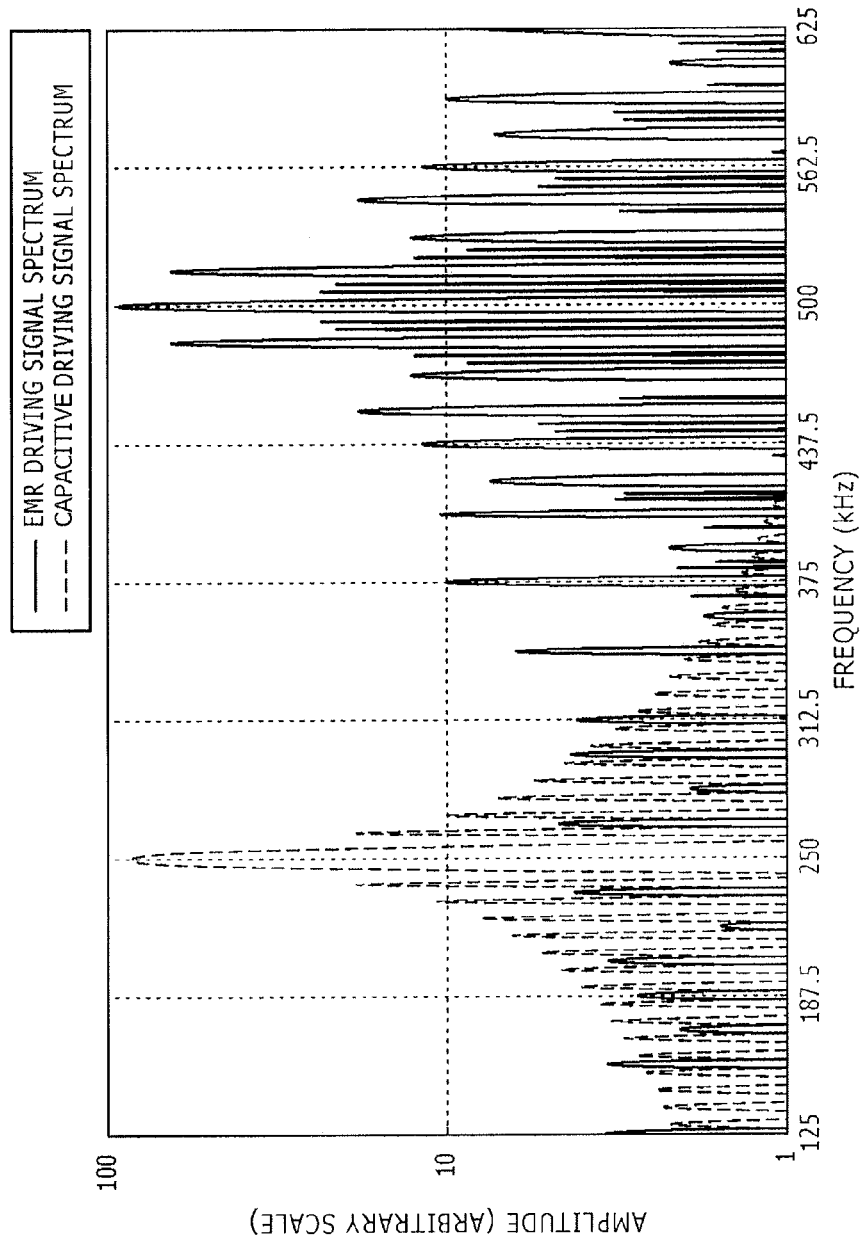

POSITION DETECTION APPARATUS

CROSS REFERENCE TO RELATED APPLICATIONS

The present application claims the benefit under 35 U.S.C. 119 of Japanese Patent Application No. 2010-049743, filed Mar. 5, 2010, the entire content of which is being incorporated herein by reference.

TECHNICAL FIELD

This invention relates to a technique suitable for application to a position detection apparatus wherein a plurality of position detection systems are combined. More particularly, the present invention relates to a position detection apparatus wherein a position detection system of an electromagnetic type for detecting a position pointed to, for example, by a position pointing device (pen) as a pointer is combined with a position detection system of a capacitive type for detecting a position pointed to, for example, by a finger as a pointer.

BACKGROUND

A touch panel apparatus is available wherein a position detection apparatus for detecting a pointed position by a pointer is combined with a display area of a liquid crystal display apparatus. The touch panel apparatus is an inputting apparatus whose display face is touched by a finger or a pen as a pointer to carry out operation of a computer or the like, and detects a position on the screen touched by a finger or a pen to provide an instruction to a computer. This touch panel is utilized widely in a PDA (Personal Digital Assistant), an ATM (Automated Teller Machine), a ticket-vending machine in a railway station and so forth.

Many position detection systems can be adopted by the touch panel. For example, a resistive type system wherein position detection is carried out based on a variation of the resistance, which is caused by the pressure applied to the touch panel by a pointer, a capacitive system wherein position detection is carried out based on a variation of the capacitance between sensor conductors, and so forth are available.

One example of a prior position detection system is disclosed in Japanese Patent Laid-Open No. HEI 10-020992.

SUMMARY OF THE INVENTION

A position detection apparatus is known which uses a combination of a plurality of position detection systems in order to detect a pen and a finger as pointers at the same time. Where, for example, a pointer position detection section of an electromagnetic system and another pointer position detection section of a capacitive type system are accommodated in one housing, the pointer position detection section of the electromagnetic system generates an alternating magnetic field having a predetermined frequency in order to cause a resonance circuit, which is incorporated in a pen as a position pointer, to resonate. This alternating magnetic field sometimes has an influence as noise on the position detection section of the capacitive type system and sometimes gives rise to deterioration of the position detection performance by the capacitive type system.

The present invention has been made in view of such a point as described above, and according to one aspect of the present invention a position detection apparatus incorporating a plurality of position detection systems is provided, wherein interference of transmission signals when these position detection systems operate at the same time can be suppressed thereby to prevent deterioration of a detection performance of the position pointed to by a pointer such as a pen or a finger to achieve a stabilized position pointing performance.

In order to solve the problem described above, according to a position detection apparatus of the present invention, selection position information of a transmission conductor in a first position detection system is utilized for selecting a reception conductor in a second position detection system thereby to increase the spatial distance between the transmission conductor in the first position detection system and the reception conductor in the second position detection system as much as possible. Alternatively, it is also possible to carry out selection control of a transmission conductor based on the selection position information of a reception conductor. Further, a relationship of frequency interleave is provided between a transmission signal to be supplied to the transmission conductor in the first position detection system and another transmission signal to be supplied to the transmission conductor in the second position detection system.

According to the present invention, in the position detection apparatus wherein a plurality of position detection systems are combined and operated simultaneously with each other, such a situation that a transmission signal to a sensor conductor used by one of the position detection apparatus is received as noise by the other position detection apparatus to have a negative influence can be suppressed effectively. Consequently, the position detection apparatus can be provided which prevents deterioration of the position detection performance and can achieve a stabilized position detection function.

BRIEF DESCRIPTION OF THE DRAWINGS

FIGS. 7A and 7B are waveform diagrams of the two types of transmission signals in a second embodiment of the present invention.

FIG. 8 is a view illustrating a disposition relationship between frequency spectra of the two types of transmission signals, respectively, in the second embodiment of the present invention.

DESCRIPTION OF THE INVENTION

In the following, embodiments of the present invention are described with reference to FIGS. 1 to 8.

First Embodiment

Figure 1:
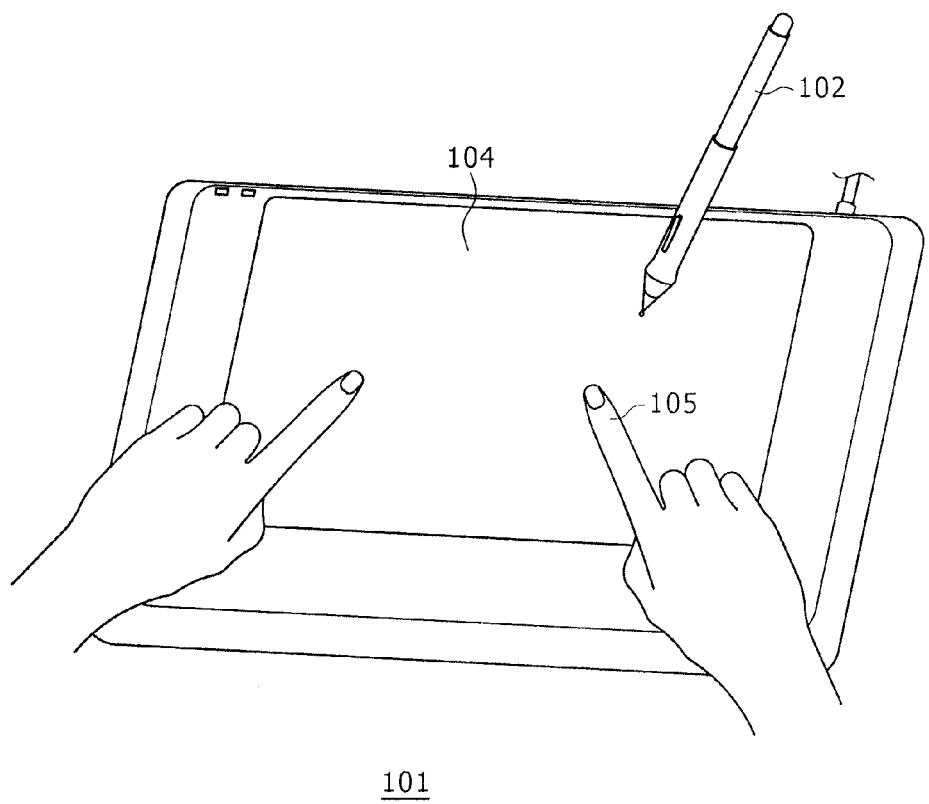
FIG. 1 is a perspective view of an entire position detection apparatus showing an example of an embodiment of the present invention.

FIG. 1 is a perspective view of an entire position detection apparatus showing an example of a first embodiment of the present invention. The position detection apparatus 101 includes a position detection region 104 for detecting the positions pointed to by a pen 102 as a first position pointer and a finger 105 as a second position pointer, and position information corresponding to an operation of the pen 102 and the finger 105 is supplied to an apparatus such as a personal computer (not shown). Further, a transparent protective cover of a glass plate, an acrylic resin plate or the like, hereinafter described, is disposed on the position detection region 104, and a display section such as a known LCD display unit is disposed below the protective cover. The LCD display unit displays a signal supplied thereto from the apparatus such as a personal computer.

Accordingly, by operating the pen 102 on the position detection region 104, a user can draw on the LCD display unit. Similarly, by moving the finger 105, for example, a user can expand (enlarge), contract (shrink), or rotate an image displayed on the LCD display unit.

Figure 2:
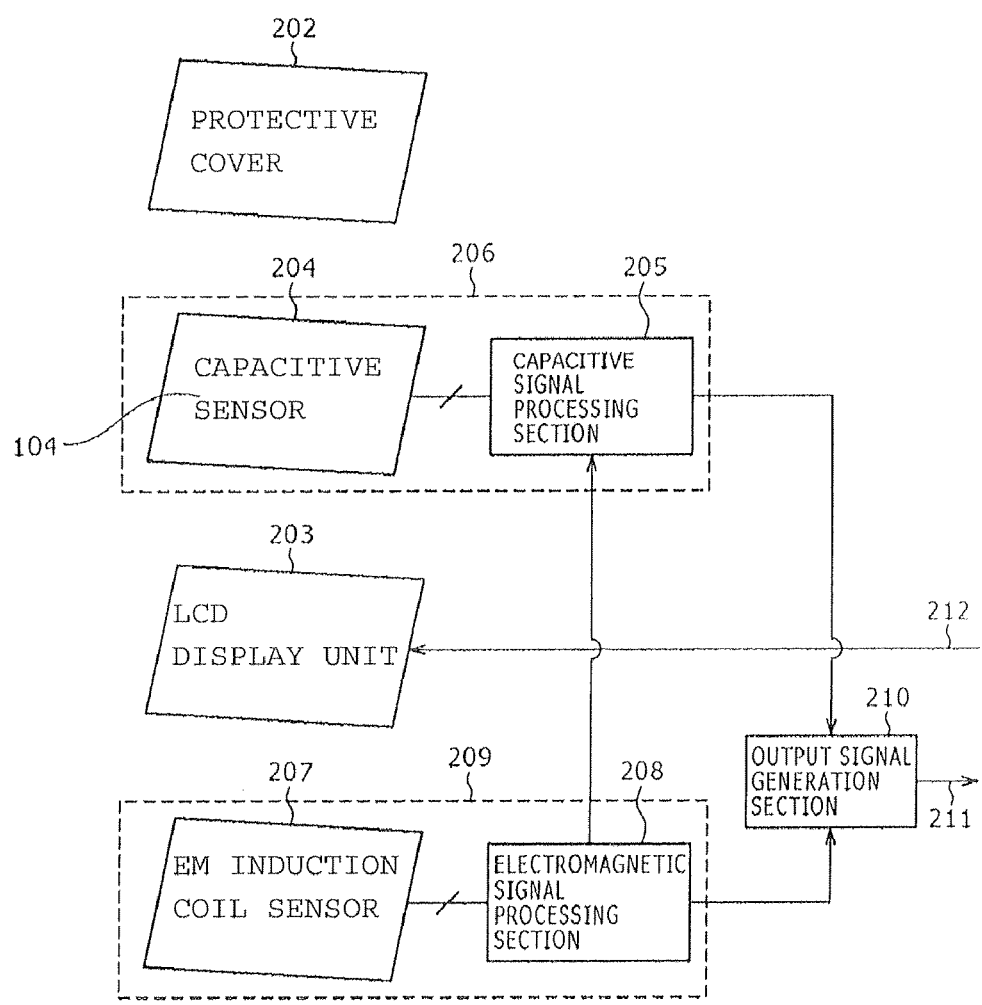
FIG. 2 is a block diagram showing a general configuration of a first embodiment of the present invention.

FIG. 2 is a block diagram illustrating a general internal configuration of the position detection apparatus 101. A protective cover 202 is formed of a transparent material, such as a glass plate or an acrylic resin plate, in order to physically protect the position detection region 104 and to allow a display image on an LCD display unit 203 disposed underneath to be transmitted therethrough. A capacitive sensor 204 is disposed below the protective cover 202. In the capacitive sensor 204, a plurality of transparent electrodes of an ITO (Indium Tin Oxide) film or the like are disposed in a first direction and a second direction intersecting with the first direction to form a sensor of a grid structure, and the position pointed to by the finger 105 on the position detection region 104 is detected. The capacitive sensor 204 is connected to a capacitive signal processing section 205 and detects a capacitance variation of a capacitor formed at a crossing point of a plurality of transparent electrodes which form the capacitive sensor 204 to detect the pointing position of the finger 105. It is to be noted that the capacitive sensor 204 and the capacitive signal processing section 205 form a capacitive type position detection section 206.

The LCD display unit 203 is disposed below the capacitive sensor 204 and displays a video signal 212 supplied thereto from the apparatus such as the personal computer. An electromagnetic induction coil sensor 207 is disposed below the LCD display unit 203. The electromagnetic induction coil sensor 207 is formed of a plurality of loop coils. The individual loop coils are disposed in the first direction and the second direction different from the first direction similarly as in the electrode disposition structure of the capacitive sensor 204 to form a sensor of a grid structure. The electromagnetic induction coil sensor 207 is connected to an electromagnetic signal processing section 208. By establishing known electromagnetic induction coupling with the pen 102 as a position pointer, the position pointed to on the position detection region 104 by the pen 102 can be detected. It is to be noted that the electromagnetic induction coil sensor 207 and the electromagnetic signal processing section 208 form an electromagnetic type position detection section 209. The electromagnetic signal processing section 208 successively supplies a transmission signal, that is, an AC signal having a predetermined frequency, for a predetermined period of time to each of the loop coils which form the electromagnetic induction coil sensor 207, and then switches over the loop coils so that they function as reception coils to detect an induction magnetic field generated by the pen 102. In particular, if the pen 102 as a position pointer, which has a built-in resonance circuit (not shown), exists in the neighborhood of a loop coil, then an alternating magnetic field transmitted from the loop coil causes the coil which forms the resonance circuit to generate an electric current based on mutual electromagnetic induction. Based on this electric current, the coil which forms the resonance circuit generates the induction magnetic field. Even if the AC signal supplied to the loop coil is stopped, the induction magnetic field continues to be generated for a predetermined period of time. By detecting the induction magnetic field by means of the loop coil which is in a signal receiving state, the position of the pen 102 as a position pointer is detected.

Since the electromagnetic type position detection section 209 detects the position of the pen 102 based on mutual electromagnetic induction with the pen 102, even if the pen 102 and the electromagnetic induction coil sensor 207 are spaced from each other by some distance, the electromagnetic type position detection section 209 can detect the position pointed to by the pen 102. However, since the capacitive type position detection section 206 of the capacitive type detects a capacitance variation of a capacitor caused by close approaching of the finger 105 as a position pointer to the electrodes, preferably the distance from the capacitive sensor 204 to the finger 105 is as small as possible. Therefore, in the illustrated embodiment, the capacitive sensor 204 is disposed immediately below the protective cover 202, and the electromagnetic induction coil sensor 207 is disposed below the capacitive sensor 204 with the LCD display unit 203 interposed therebetween.

Pointed position data outputted from the capacitive signal processing section 205 and pointed position data outputted from the electromagnetic signal processing section 208 are inputted to an output signal generation section 210. The output signal generation section 210 converts the two pointed position data into data of a predetermined transmission format and outputs the pointed position data of the predetermined transmission format as an output signal 211 to an externally connected apparatus such as a personal computer (not shown). It is to be noted that the personal computer side separates the two received pointed position data and, for example, incorporates and utilizes the pointed position data in application software. As an example, in the case of image drawing software, if two fingers 105 are used to carry out a drag operation, then this is recognized as an instruction to expand or contract a screen image being currently displayed, and a certain screen image size is set by this operation. Then, an image can be drawn by operating the pen 102 on the screen image set to the predetermined size. In the present example, the position data based on the operation of the fingers 105 as the pointers are used as an instruction for expansion or contraction of a screen image, and the position data based on the operation of the pen 102 having a shape of a pen are used as an instruction for image drawing.

The LCD display unit 203 interposed between the capacitive sensor 204 and the electromagnetic induction coil sensor 207 receives a video signal 212 supplied thereto from the externally connected apparatus such as the personal computer and carries out predetermined display.

[Electromagnetic Type Position Detection Section 209]

Figure 3:
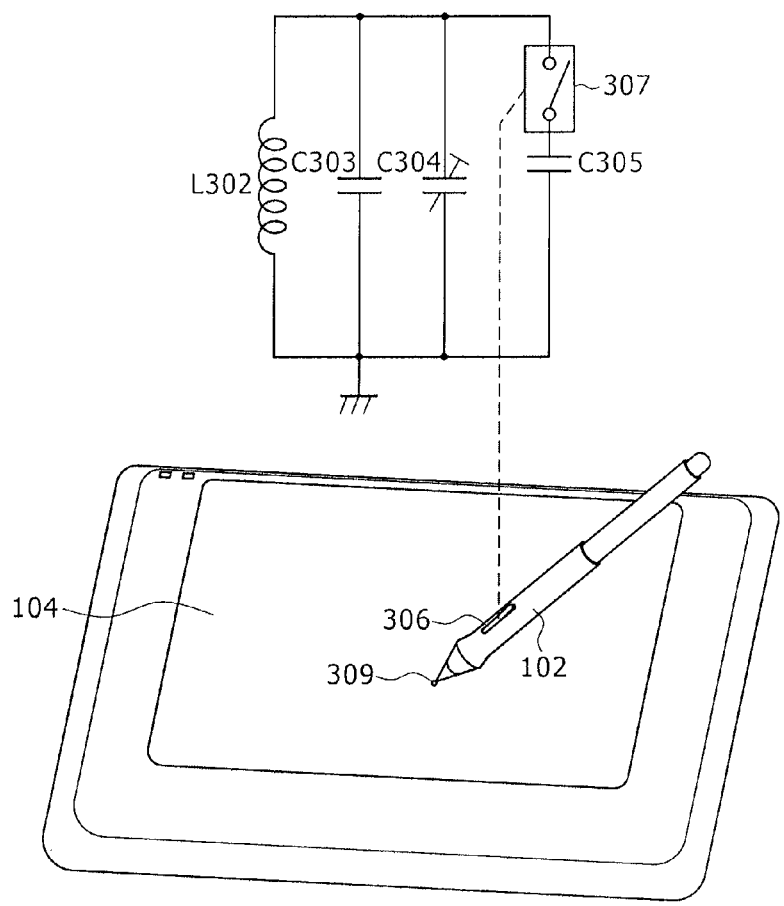
FIG. 3 is a circuit diagram of a position pointer.

Functions and operation of the electromagnetic type position detection section 209 are described with reference to FIGS. 3 and 4. FIG. 3 shows a configuration of a resonance circuit provided in the pen 102. A coil L302, a capacitor C303 and a semi-fixed capacitor C304 are connected in parallel and form a known resonance circuit. The resonance circuit resonates in response to reception of an alternating magnetic field from loop coils 408 (408a to 408d) which form the electromagnetic induction coil sensor 207 shown in FIG. 4, and generates an alternating magnetic field based on a resonance frequency of the resonance circuit after transmission of the alternating magnetic field from the loop coils 408 stops, and supplies the alternating magnetic field to the loop coils 408 which form the electromagnetic induction coil sensor 207. It is to be noted that, as described hereinabove, when an alternating magnetic field from the pen 102 is to be received, the loop coils 408 are switched over so as to function as reception coils for receiving a signal from the pen 102.

A capacitor C305 and a pushbutton switch 307, which operates in an interlocked relationship with an operation of a pushbutton 306 provided on a side face of the pen 102, are connected in series to each other and are connected in parallel to the coil L302, capacitor C303 and semi-fixed capacitor C304. Accordingly, if the pushbutton switch 307 is controlled between on and off, then the composite capacitance of the capacitors which form the resonance circuit varies, and as a result, the resonance frequency of the resonance circuit varies in response to the state of the pushbutton switch 307. By discriminating the variation of the resonance frequency, the position detection apparatus 101 can determine not only the position pointed to by a pen tip 309 but also the operation state of the pushbutton 306.

Figure 4:
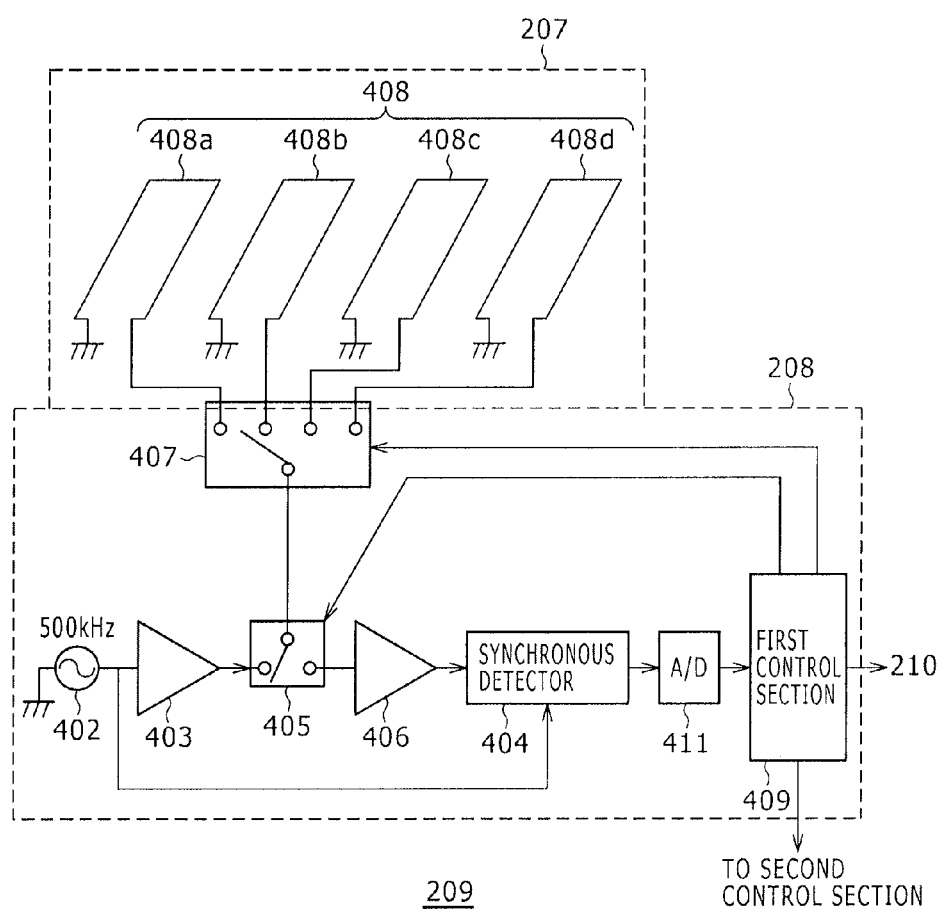
FIG. 4 is a block diagram of an electromagnetic type position detection section.

FIG. 4 is a block diagram of the electromagnetic type position detection section 209.

An oscillation circuit 402 generates a sine wave AC signal or a square wave signal of a frequency substantially equal to the resonance frequency of the resonance circuit of the pen 102 described hereinabove, and supplies the generated signal to a current driver 403 and a synchronous detector 404. The current driver 403 current-amplifies the signal of the predetermined frequency oscillated by the oscillation circuit 402 and supplies the amplified signal to a transmission/reception switching circuit 405.

The transmission/reception switching circuit 405 selectively connects one of an output terminal of the current driver 403 and an input terminal of a reception amplifier 406 to a coil selection circuit 407. The coil selection circuit 407 selects one of a plurality of loop coils 408a, 408b, 408c and 408d which form the electromagnetic induction coil sensor 207 and connects the selected loop coil to the transmission/reception switching circuit 405.

Where the coil selection circuit 407 and the current driver 403 are connected to each other through the transmission/ reception switching circuit 405, a signal supplied from the current driver 403 is supplied to the loop coils 408a, 408b, 408c and 408d successively selected under the coil-selection control of the coil selection circuit 407. Where the coil selection circuit 407 and the reception amplifier 406 are connected to each other through the transmission/reception switching circuit 405, signals received by the loop coils 408a, 408b, 408c and 408d under the coil-selection control of the coil selection circuit 407 are inputted to the reception amplifier 406. It is to be noted that selection for the transmission/ reception switching circuit 405 and the coil selection circuit 407 are controlled by control signals supplied thereto from a first control section 409 hereinafter described.

The loop coils 408a, 408b, 408c and 408d of a substantially rectangular shape are juxtaposed in parallel to each other on the same plane. The loop coils 408a, 408b, 408c and 408d are connected at one terminal thereof to the coil selection circuit 407 and grounded at the other terminal thereof. Where one of the loop coils selected by the coil selection circuit 407 is connected to the output terminal of the current driver 403 through the transmission/reception switching circuit 405, an alternating magnetic field is generated from one of the loop coils selected by the coil selection circuit 407 in response to a signal supplied thereto from the current driver 403. Accordingly, when the pen 102 is positioned in the neighborhood of a loop coil from which an alternating magnetic is generated, induction electromotive force is generated in the resonance circuit in the pen 102.

If one of the loop coils successively selected by the coil selection circuit 407 is connected to the reception amplifier 406 through the transmission/reception switching circuit 405 controlled by a control signal from the first control section 409, then the loop coil is placed into a state in which it can receive an alternating magnetic field generated by the resonance circuit of the pen 102. If the loop coil 408 receives an alternating magnetic field generated by the resonance circuit of the pen 102, then a weak AC signal is generated in the loop coil 408. The reception amplifier 406 converts the current into a voltage and amplifies the voltage and supplies the amplified voltage to the input terminal of the synchronous detector 404.

In particular, where the coil selection circuit 407 and the current driver 403 are connected to each other through the transmission/reception switching circuit 405, the electromagnetic type position detection section 209 is in a signal transmitting state to the pen 102. On the other hand, where the coil selection circuit 407 and the reception amplifier 406 are connected to each other through the transmission/reception switching circuit 405, the electromagnetic type position detection section 209 is in a signal receiving state from the pen 102.

It is to be noted that, where the pen 102 is not positioned in the neighborhood of a loop coil from which an alternating magnetic field is generated, sufficient induction electromotive force for position pointing is not generated in the resonance circuit in the pen 102.

By disposing the loop coils 408a, 408b, 408c and 408d, which form the electromagnetic induction coil sensor 207, in parallel to each other in the first direction, and disposing another electromagnetic induction coil sensor 207 having a similar configuration but with its loop coils arranged in the second direction different from the first direction, a two-dimensional position, that is, an X coordinate and a Y coordinate of a position pointed to on the position detection region 104 by the pen 102 can be detected.

An A/D converter 411 converts an analog signal from the synchronous detector 404 into a digital signal.

The synchronous detector 404 is known and includes an analog multiplier such that a signal obtained by multiplication of a signal from the oscillation circuit 402 and a reception signal is outputted. Where the signal from the oscillation circuit 402 and the reception signal have frequencies coincident with each other, the synchronous detector 404 outputs a high signal level, but where the signal from the oscillation circuit 402 and the reception signal have frequencies different from each other, the output signal level of the synchronous detector 404 drops. It is to be noted that a variation of the frequency is caused by a variation of the resonance frequency of the resonance circuit of the pen 102. In particular, as the capacitor C305 is incorporated into the resonance frequency by the pushbutton switch 307, the composite capacitance of the capacitors which form the resonance circuit varies, and the level of the signal obtained from the synchronous detector 404 varies in response to the variation of the composite capacitance.

Based on the level of the signal obtained from the synchronous detector 404, the frequency variation of the AC magnetic field generated by the pen 102 can be detected, and from this frequency variation, the operation state of the pushbutton 306 provided in the pen 102 can be detected.

[Capacitive Type Position Detection Section 206]

Figure 5:
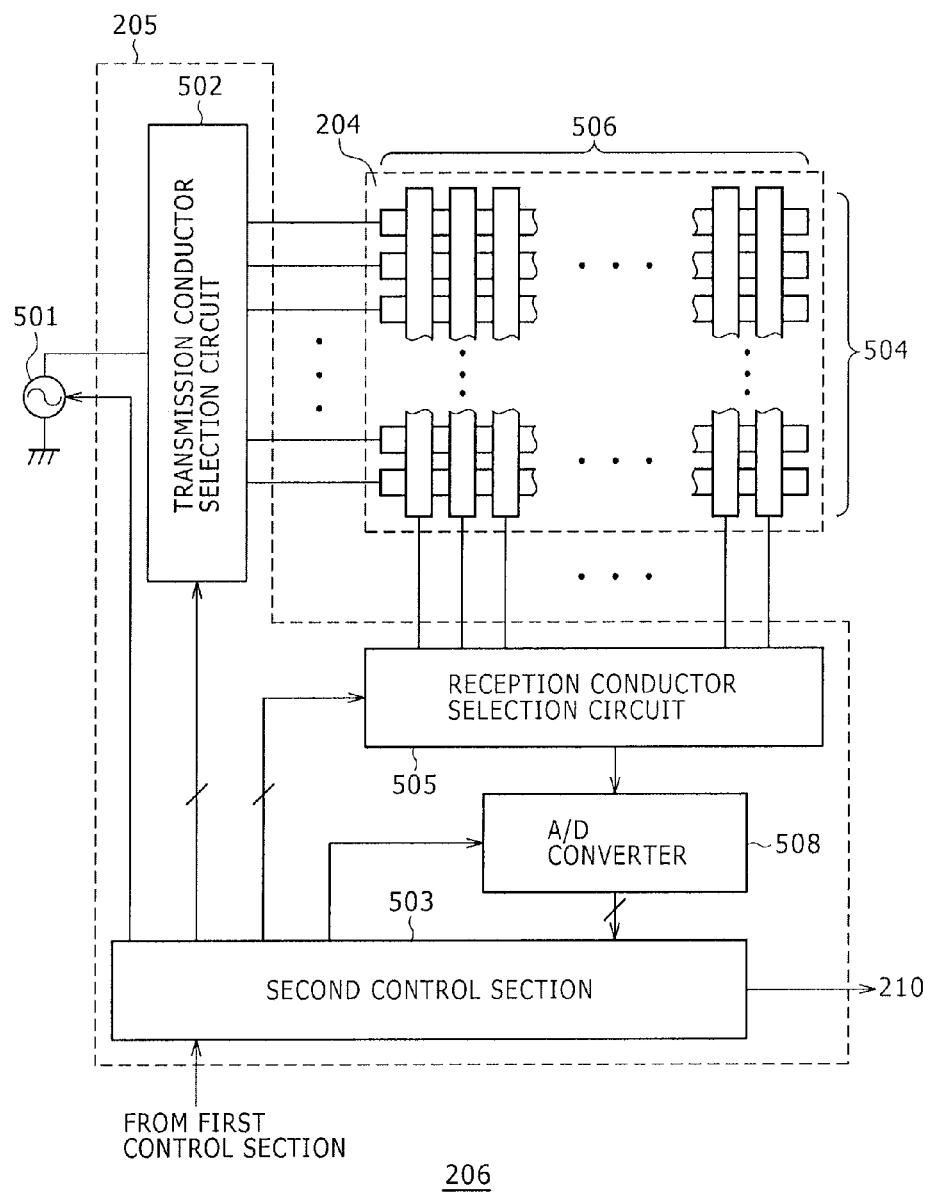
FIG. 5 is a block diagram of a capacitive type position detection section.

FIG. 5 is a block diagram of the capacitive type position detection section 206. Functions and operation of the capacitive type position detection section 206 are described with reference to FIG. 5. A second control section 503 supplies a transmission conductor selection signal for selecting transmission conductors 504 in a predetermined sequence to a transmission conductor selection circuit 502. Accordingly, an AC signal generated by an oscillation circuit 501 and having a predetermined frequency is successively supplied to the transmission conductors 504, which form the capacitive sensor 204, through the transmission conductor selection circuit 502. Also a reception conductor selection circuit 505 is controlled based on a reception conductor selection signal from the second control section 503. Consequently, reception conductors 506 which form the capacitive sensor 204 are successively selected and connected to an A/D converter 508 in accordance with a predetermined reception conductor selection sequence. The A/D converter 508 converts a signal from a reception conductor 506 selected by the reception conductor selection circuit 505 into digital data. In the present example, the second control section 503 controls the transmission conductor selection circuit 502 to determine a transmission conductor 504 to which an AC signal is to be supplied, and receives a signal from a reception conductor 506 through the reception conductor selection circuit 505 and the A/D converter 508, and determines and supplies presence or absence or pointed position information of the finger 105 on the position detection region 104 to the output signal generation section 210.

In the position detection apparatus wherein a plurality of position systems such as the pointer position detection system of an electromagnetic induction system and the pointer position detection system of a capacitive type system are combined and operated simultaneously with each other as described above, a transmission signal to a sensor conductor which is used by one of the position detection apparatus sometimes has a negative influence as noise on the other position detection apparatus. In the present embodiment, there is the possibility that a signal from the oscillation circuit 402 provided in the electromagnetic type position detection section 209 of an electromagnetic induction system emitted through the respective loop coils 408 which form the electromagnetic induction coil sensor 207 may have a negative influence when received by a reception conductor 506 which forms the capacitive sensor 204 provided in the capacitive type position detection section 206 of a capacitive type system. Further, there is the possibility that a transmission signal generated by the oscillation circuit 501 provided in the capacitive type position detection section 206 of a capacitive type system and emitted from the transmission conductor 504 which forms the capacitive sensor 204 may be received as noise similarly when the loop coils 408 which form the electromagnetic induction coil sensor 207 provided in the electromagnetic type position detection section 209 of an electromagnetic induction system are in a state in which they function as reception coils.

Figure 6:
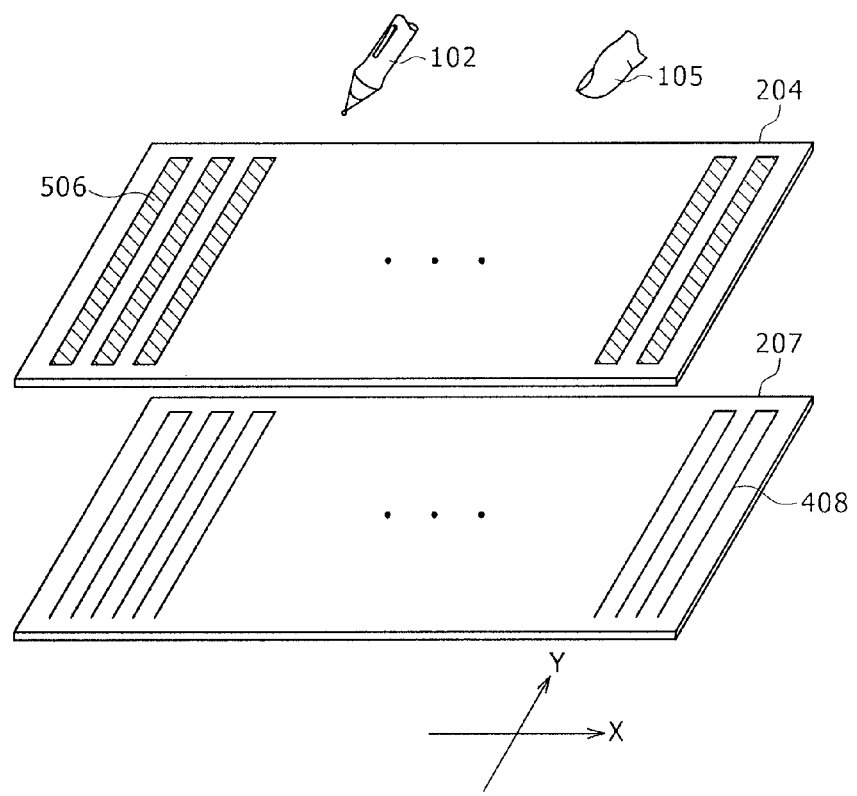
FIG. 6 is a view illustrating a conductor selection relationship between transmission conductors and reception conductors in the first embodiment of the present invention.

FIG. 6 illustrates a spatial disposition relationship between the electromagnetic induction coil sensor 207 and the capacitive sensor 204. The electromagnetic induction coil sensor 207, on which the loop coils 408 extend in the Y-axis direction and are disposed in parallel to each other in the X-axis direction, and the capacitive sensor 204, on which the reception conductors 506 that extend in the Y-axis direction and are disposed in parallel to each other in the X-axis direction are disposed in a superposed relationship with each other, with the LCD display unit 203 interposed therebetween though not shown. It is to be noted that, in the present embodiment, the loop coils 408 are in a state in which they are transmitting an alternating magnetic field to the pen 102. Further, while in FIG. 6 the loop coils 408 are disposed on one of the faces of a substrate which forms the electromagnetic induction coil sensor 207, loop coils 408 having an orthogonal disposition relationship to the loop coils 408 shown are also formed on the other face of the substrate such that, by this configuration, the position pointed to by the pen 102 can be detected two-dimensionally (X/Y coordinates). In the same manner, while the reception conductors 506 are disposed on one of the faces of a substrate of the capacitive sensor 204, the transmission conductors 504 having an orthogonal relationship to the reception conductors 506 are also formed on the other face of the substrate, such that the position pointed to by the finger 105 as a pointer can be detected two-dimensionally (X/Y coordinates) in cooperation with the reception conductors 506. In particular, the loop coils 408, which form the electromagnetic induction coil sensor 207 and perform the function of alternating magnetic field transmission, and the reception conductors 506 that form the capacitive sensor 204 are disposed such that their extending directions and parallel disposition directions are spatially the same. It is to be noted that, in the embodiment shown in FIG. 6, the extending direction is in the Y direction and the parallel disposition direction is in the X direction.

In the first embodiment of the present invention, when an alternating magnetic field is transmitted from a particular loop coil 408 to the pen 102 through the coil selection circuit 407 which forms the electromagnetic type position detection section 209 shown in FIG. 4, information of such a selected coil position is supplied from the first control section 409 to the second control section 503 which forms the capacitive type position detection section 206 shown in FIG. 5. The second control section 503 acquires the selection information of a loop coil for transmission of an alternating magnetic field and controls the selection position of a reception conductor 506 for determining the pointing position of the finger 105 as a pointer in accordance with the selection information. In the embodiment shown in FIG. 6, if the loop coils 408, which are in a state for transmitting an alternating magnetic field, and the reception conductors 506 are successively selected in the X-axis direction, that is, in order from the left side toward the right side in FIG. 6, and the loop coil 408 positioned at the left end is selected as the loop coil 408 for transmitting an alternating magnetic field, then the second control section 503 controls the reception conductor selection circuit 505 based on the selection information of the loop coil for transmission supplied from the first control section 409 so that a reception conductor 506 disposed substantially at the center on the capacitive sensor 204 is selected. In response to successive selection of the loop coils 408 along the X-axis direction in order to transmit an alternating magnetic field, the reception conductors 506 are successively selected in the same direction along the X-axis direction, similarly. Consequently, a predetermined distance is always assured between the selected loop coil 408 and the selected reception conductor 506.

It is to be noted that, while it is described that the selective control of the reception conductors is carried out based on the selection position information of a transmission conductor, it is also possible to carry out selection control of the transmission conductors based on selection position information of a reception conductor. Specifically, there are four types of selective control: (1) the selective control of the loop coils 408 (not shown), having an orthogonal disposition relationship to the loop coils 408 shown in FIG. 4, as the reception conductors based on the selection position information of the transmission conductors 504; (2) the selective control of the reception conductors 506 based on the selection position information of the loop coils 408 as the transmission conductors; (3) the selective control of the loop coils 408 as the transmission conductors based on the selection position information of the reception conductors 506; and (4) the selective control of the transmission conductors 504 based on the selection position information of the loop coils 408 (not shown), having an orthogonal disposition relationship to the loop coils 408 shown in FIG. 4, as the reception conductors.

Also, while it is assumed that, if in FIG. 6 the loop coils 408 and the reception conductors 506 are successively selected from the left side to the right side along the X-axis direction, after the loop coil 408 and the reception conductor 506 disposed at the right end position are selected, subsequently the loop coil 408 and the reception conductor 506 positioned at the left end are selected, the present invention is not limited to the present embodiment. It is only necessary for the selection position of a loop coil 408 for transmitting an alternating magnetic field and the selection position of a reception conductor 506 to be individually controlled so that a certain predetermined distance may be assured between the two selection positions. In other words, for the loop coils 408, not only an approach for successively selecting the loop coils disposed adjacent to each other but also another approach for selecting the loop coils at random based on a predetermined sequence can be adopted. In this instance, the selection position of a reception conductor 506 is controlled in an associated relationship with the selection position of a loop coil 408.

Further, in each of the electromagnetic induction coil sensor 207 and the capacitive sensor 204, loop coils and conductors which have an orthogonally disposed relationship are disposed on one face and the other face of a substrate. In one example, the reception conductors 506 which form the capacitive sensor 204 and have a disposition direction similar to the disposition direction of the loop coils 408 for transmission of an alternating magnetic field which form the electromagnetic induction coil sensor 207 are used for addressing a technical problem to be solved. Specifically, where the loop coils 408 disposed on one face of the electromagnetic induction coil sensor 207 and the loop coils 408 disposed on the other face of the electromagnetic induction coil sensor 207 are selectively used to function as the loop coils for transmission of an alternating magnetic field, in response to a selection operation of the loop coils 408 extending in the Y direction as shown in FIG. 4 as the transmission conductors, the reception conductors 506 which also extend in the Y direction and are forming the capacitive sensor 204 as shown in FIG. 5, i.e., the reception conductors 506 having a similar disposition relationship to the loop coils 408 selected as the transmission conductors, are selected.

Second Embodiment

Frequency Interleave

FIG. 7A illustrates a signal supplied to the loop coils 408 provided in the electromagnetic type position detection section 209 (referred to as "EMR (Electro-Magnetic Resonance) driving signal") and FIG. 7B illustrates a signal supplied to the transmission conductors 504 provided in the capacitive type position detection section 206 (referred to as capacitive driving signal).

In FIG. 7A, the oscillation circuit 402 shown in FIG. 4 generates a sine wave AC signal of a frequency (e.g., 500 KHz) substantially equal to the resonance frequency of the resonance circuit of the pen 102. In the present embodiment, the loop coils 408 include four loop coils 408a, 408b, 408c and 408d for the convenience of description, and each of the coils is placed into a selected state for a period of 64 μS by the coil selection circuit 407, which is controlled by a predetermined sequence in accordance with an instruction from the first control section 409. Further, the selection operation of the coils is repeated for one cycle of 256 μS. Within the period of 64 μS selected by the coil selection circuit 407, switching control of the coils is carried out at intervals of a signal transmission period of 28 μS, a switching transition period of 4 μS, and a signal reception period of 32 μS, by the transmission/reception switching circuit 405 that carries out switching control in accordance with an instruction from the first control section 409. Accordingly, in the signal transmission period of 28 μS, the sine wave signal of 500 KHz generated by the oscillation circuit 402 is supplied to the coil.

In FIG. 7B, the sine wave signal of 250 KHz, for example, generated by the oscillation circuit 501 shown in FIG. 5 is supplied to the conductors which form the transmission conductors 504 through the transmission conductor selection circuit 502. The transmission conductor selection circuit 502 supplies the sine wave signal, which is generated by the oscillation circuit 501 in accordance with the predetermined transmission conductor selection sequence based on a control signal from the second control section 503, to a desired transmission conductor 504. In the present embodiment, each of the conductors which form the transmission conductors 504 is successively selected for every 128 μS (i.e., one conductor per 128 μS). Further, if all of the conductors which form the transmission conductors 504 are selected, then such a transmission conductor selection sequence is applied again to repeat the transmission conductor selection process of the transmission conductors 504. Also in the case illustrated in FIG. 7B, the sine wave signal generated by the oscillation circuit 501 is supplied for a period of 128 μS to each of the conductors which form the transmission conductors 504 through the transmission conductor selection circuit 502. In other words, the sine wave signal generated by the oscillation circuit 501 is supplied intermittently to each of the transmission conductors 504.

FIG. 8 illustrates frequency spectra of the two types of transmission signals (EMR driving signal and capacitive driving signal) illustrated in FIGS. 7A and 7B, respectively. Regarding the intermittent signal of 500 KHz illustrated in FIG. 7A, side lobes are generated on peripheries around a main lobe of 500 KHz. Regarding the intermittent signal of 250 KHz illustrated in FIG. 7B, side lobes are generated on peripheries around a main lobe of 250 KHz. Furthermore, the transmission signal illustrated in FIG. 7A and the transmission signal illustrated in FIG. 7B have a relationship of frequency interleave, that is, a relationship in which the frequency spectrum of the transmission signal illustrated in FIG. 7B is interposed (interleaved or inserted) in the frequency spectrum of the transmission signal illustrated in FIG. 7A. Further, the oscillation circuit 402 shown in FIG. 4 and the oscillation circuit 501 shown in FIG. 5 are controlled by the first control section 409 and the second control section 503, respectively, so as to control at least one of the frequency of the oscillation circuit 402 and the frequency of the oscillation circuit 501 in association with the frequency of the other circuit in order to maintain the relationship of frequency interleave. Where the relationship of frequency interleave exists between the transmission signal illustrated in FIG. 7A and the transmission signal illustrated in FIG. 7B, in an extraction process of a reception signal in each of the electromagnetic type position detection section 209 and the capacitive type position detection section 206, signal interference from the other detection section can be eliminated appropriately by using a noise removing filter.

It is to be noted that the signal to be supplied to the transmission conductors is not limited to a sine wave signal, but naturally it is possible to apply a rectangular wave signal, a pulse signal and so forth as well.

It is to be noted that the resonance frequency of the resonance circuit varies in response to the state of the pushbutton switch 307 as described hereinabove with reference to FIG. 3. In the present invention, the deviation of the resonance frequency of the resonance circuit, which varies in response to the state of the pushbutton switch 307, is defined so as to correspond to the spectrum of the EMR driving signal illustrated in FIG. 8. In particular, since the EMR driving signal has a transmission period of 28 μS and a switching transition period of 4 μS as illustrated in FIG. 7A, it has frequency components disposed at frequency intervals of 1/(28 μS+4 μS), that is, 31.25 KHz. Accordingly, by setting the capacitance value of the capacitor C305 shown in FIG. 3 so that the deviation of the resonance frequency of the resonance circuit, which varies depending upon the state of the pushbutton switch 307, becomes an integral multiple the frequency of 31.25 KHz, the relationship of frequency interleave with respect to the capacitive driving signal illustrated in FIG. 7B is maintained irrespective of the state of the pushbutton switch 307.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A position detection apparatus, comprising:
a first position detection circuit including a first sensor formed of a first set of conductors disposed in a first direction and a second set of conductors disposed in a direction different from the first direction, a first conductor selection circuit connected to said first sensor and configured to select the first set of conductors in accordance with a transmission conductor selection sequence, and an oscillation circuit configured to supply a signal to the first set of conductors through said first conductor selection circuit, the first position detection circuit being configured to detect a position pointed to by a first pointer on said first sensor;
a second position detection circuit including a second sensor formed of a third set of conductors disposed in substantially the same direction as the first direction and a fourth set of conductors disposed in a direction different from the first direction, the second sensor being disposed in a superposed relationship with said first sensor, and a second conductor selection circuit connected to said second sensor and configured to select the third set of conductors disposed in substantially the same direction as the first direction in accordance with a reception conductor selection sequence, the second position detection circuit being configured to detect a position pointed to by a second pointer on said second sensor; and
a control circuit configured to direct said first conductor selection circuit to select a transmission conductor selection position among the first set of conductors where the first pointer is detected, and to direct said second conductor selection circuit to select a reception conductor selection position among the third set of conductors where the second pointer is detected, such that the selected transmission conductor selection position and the selected reception conductor selection position are separated from each other by a predetermined spatial distance.

2. The position detection apparatus according to claim 1, wherein the first set of conductors disposed in the first direction are each formed of a loop coil, and the first position detection circuit further comprises a transmission/reception switching circuit configured to time-divisionally switch between supplying a signal from the oscillation circuit to the loop coil selected by said first conductor selection circuit and receiving a signal from the loop coil selected by said first conductor selection circuit.

3. The position detection apparatus according to claim 2, wherein said first position detection circuit is configured to electromagnetically detect a position pointed to by the first pointer, by transmitting a signal from any of the loop coils through said transmission/reception switching circuit to be received by a resonance circuit in the first pointer and by receiving a signal emitted from the resonance circuit with the loop coils.

4. The position detection apparatus according to claim 1, wherein the control circuit is configured to direct said second conductor selection circuit to select a reception conductor selection position separated by the predetermined spatial distance from the transmission conductor selection position that has been selected by said first conductor selection circuit.

5. The position detection apparatus according to claim 1, wherein the control circuit is configured to direct said first conductor selection circuit to select a transmission conductor selection position separated by the predetermined spatial distance from the reception conductor selection position that has been selected by said second conductor selection circuit.

6. The position detection apparatus according to claim 1, wherein the second position detection circuit further comprises a third conductor selection circuit configured to select the fourth set of conductors of said second sensor in accordance with a transmission conductor selection sequence, and a second oscillation circuit configured to supply a signal to the fourth set of conductors through said third conductor selection circuit, the second position detection circuit being configured to detect a position pointed to by the second pointer based on a variation of capacitance generated in said second sensor.

7. The position detection apparatus according to claim 6, wherein the transmission signal supplied to said first sensor through said first conductor selection circuit and the transmission signal supplied to said second sensor through said third conductor selection circuit have a relationship of frequency interleave.

8. The position detection apparatus according to claim 7, wherein the control circuit is further configured to control the frequency of the transmission signal supplied to said first sensor through said first conductor selection circuit and the frequency of the transmission signal supplied to said second sensor through said third conductor selection circuit to have the relationship of frequency interleave.

9. The position detection apparatus according to claim 1, wherein said first sensor and said second sensor are disposed in a superposed relationship with each other with a display section interposed therebetween, and the position detection apparatus is configured such that position pointing by the first and second pointers is carried out on one face of said second sensor opposite to its other face that is facing said display section.

10. The position detection apparatus according to claim 1, further comprising an output signal generation circuit configured to convert pointed position data regarding positions pointed to by the first and second pointers outputted from said first position detection circuit and said second position detection circuit into data of a predetermined transmission format, which can be separated into first data regarding the first pointer and second data regarding the second pointer.

11. The position detection apparatus according to claim 10, wherein the pointed position data regarding positions pointed to by the first and second pointers include operation data regarding the first and second pointers.

12. The position detection apparatus according to claim 11, wherein the first pointer further comprises a button switch, and the operation data comprise information regarding an operation state of the button switch.

13. A method of detecting operation of one or more pointers on a first sensor and a second sensor, which are configured to detect operation of the one or more pointers and are disposed in a superposed relationship with each other, said first sensor including a first set of transmission conductors disposed in a predetermined direction and configured to transmit a first signal, said second sensor including a second set of reception conductors disposed in substantially the same direction as the first set of transmission conductors and configured to receive a second signal, said first sensor further including a third set of reception conductors and said second sensor further including a fourth set of transmission conductors both disposed in a direction different from said predetermined direction; the method comprising:
   selecting a first transmission conductor among the first set of transmission conductors for transmitting the first signal where a first pointer is detected, and
   selecting a second reception conductor among the second set of reception conductors for receiving the second signal in where a second pointer is detected,
   such that the selected first transmission conductor and the selected second reception conductor are separated from each other by a predetermined spatial distance.

14. The method of claim 13, wherein the first signal has a predetermined frequency.

15. The method of claim 13, wherein:
   detection of a pointer operation by the first sensor and detection of a pointer operation by the second sensor are carried out based on different methods from each other.

16. The method of claim 15, wherein the first sensor is configured to detect a pen operation based on an electromagnetic type detection method while the second sensor is configured to detect a finger operation based on a capacitive type detection method.

17. The method of claim 13, wherein pointer operation data detected by the first sensor and the second sensor are converted into data of a predetermined transmission format, which can be separated into first data detected by the first sensor and second data detected by the second sensor.

18. The method of claim 13, wherein the first sensor and the second sensor are disposed in a superposed relationship with each other with a display section interposed therebetween; and
   the first and second sensors are arranged such that the operation of one or more pointers is carried out on one face of said second sensor opposite to its other face that is facing the display section.

19. The method of claim 13, wherein selecting the first transmission conductor and the second reception conductor comprises first selecting the first transmission conductor and then selecting the second reception conductor that is separated by an interference-reducing distance from the selected first transmission conductor.

20. The method of claim 13, wherein selecting the first transmission conductor and the second reception conductor comprises first selecting the second reception conductor and then selecting the first transmission conductor that is separated by an interference-reducing distance from the selected second reception conductor.

* * * * *